United States Patent Office.

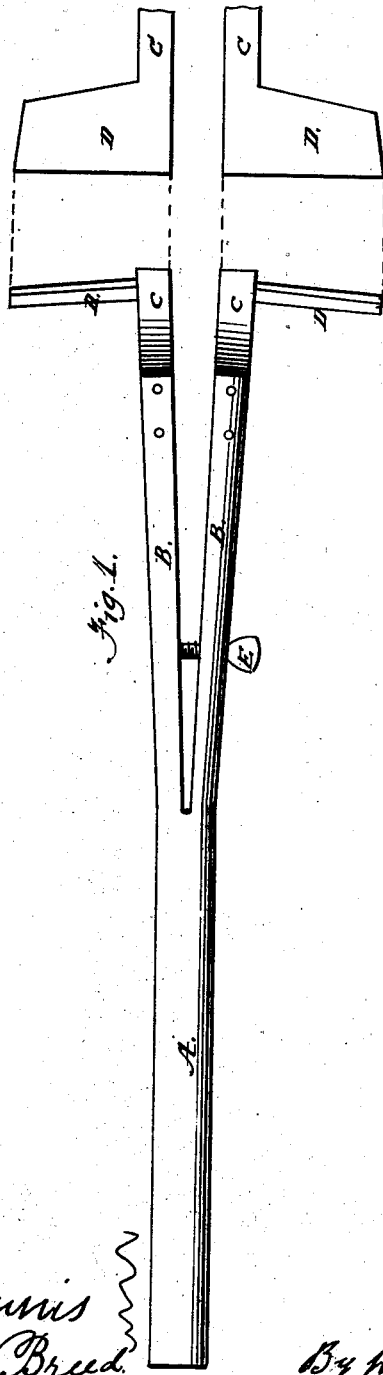

ANSON BURCHARD, OF NEW BRENTON, ILLINOIS.

Letters Patent No. 74,984, dated March 3, 1868.

---

IMPROVEMENT IN DOUBLE HOES.

---

The Schedule referred to in these Letters Patent and making part of the same.

---

TO ALL WHOM IT MAY CONCERN:

Be it known that I, ANSON BURCHARD, of New Brenton, Ford county, State of Illinois, have invented an Improvement in Double Hoes; and I do hereby declare the following description and accompanying drawings are sufficient to enable any person skilled in the art or science to which it most nearly appertains to make and use my said invention or improvement without further invention or experiment.

The nature of my invention and improvement consist in providing a double hoe, or hoe with two blades, with the means of varying and adjusting the distance of the blades from each other, so as to adapt the hoe to the circumstances and requirements of different cases or different kinds of work. In describing my invention I refer to the accompanying drawings, making a part of this specification, of which—

Figure 1 is a top view of my improved double hoe, with the handle in a horizontal position, the blades being seen obliquely, and Figure 2 a view of the two blades, seen flat-wise or from the direction of the opposite end of the handle.

The handle A may be made in the usual manner, and I divide it through the middle, by sawing or otherwise, for about one-third or one-half its length from the lower end. To the end of each branch, B B, of the forks formed by the separation of the parts, I attach, by rivets, screws, or a socket, as may be preferred, the bent shank C of a blade, D, the blades D D being made of such size and shape, and set at such an angle with the handle as may be deemed most advantageous for each particular kind of work. The handle should be secured from splitting at the upper end of the forks by a rivet or ferrule. To vary and adjust the distance between the blades, I employ a screw, E, which may have a thread in the branch next the head, and press against the other branch so as to spring it off, and thus separate the hoe-blades; or it may turn freely in the first-mentioned branch, having a pin and washer or other device to keep it in place, and screw into the other branch. I also contemplate effecting the adjustment by means of a ring surrounding the two branches B B, and a wedge between them, the ring and wedge to be moved up or down according to the extent of separation required for the blades of the hoe.

Double hoes have been found useful for plants of any kind growing in rows or drills, and by having the blades adjustable, so as to be set more or less apart, as required, it is plain that their utility will be materially increased.

What I claim as my invention and improvement in double hoes is—

Making them adjustable, so that the blades may be set near together or farther apart, as desired.

I also claim, as a means of adjusting double hoes, a cleft or forked handle provided with a screw or other device, for adjusting the separation, substantially as described.

ANSON BURCHARD.

Witnesses:
AUGUSTUS D. POTTER,
WALLACE D. LEWIS.